(12) United States Patent
Wang

(10) Patent No.: US 6,992,882 B2
(45) Date of Patent: Jan. 31, 2006

(54) AUTO-LOCKING SUPPORT STRUCTURE

(75) Inventor: Wen-Chieh Wang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 268 days.

(21) Appl. No.: 10/720,196

(22) Filed: Nov. 25, 2003

(65) Prior Publication Data

US 2005/0073808 A1   Apr. 7, 2005

(30) Foreign Application Priority Data

Oct. 2, 2003   (TW)  ............................... 92217707 U

(51) Int. Cl.
G06F 1/16   (2006.01)
(52) U.S. Cl. ...................... 361/681; 361/680; 361/683; 361/679; 248/917; 248/918; 248/279.1; 345/169

(58) Field of Classification Search ................ 361/681, 361/682, 683, 679; 235/145 R; 345/169; 248/454, 455, 456, 461, 917, 918, 279.1
See application file for complete search history.

(56) References Cited

U.S. PATENT DOCUMENTS 6,700,775 B1 * 3/2004 Chuang et al. ............. 361/680
6,882,524 B2 * 4/2005 Ulla et al. .................. 361/680

* cited by examiner

Primary Examiner—Michael Datskovskiy
(74) Attorney, Agent, or Firm—Bacon & Thomas, PLLC

(57) ABSTRACT

An auto-locking support structure lockable between the received position and the extended position by means of linking among a cover plate, a link, a slide and a pivot shaft, and biasing and prestressing from a spiral spring to the pivot shaft. The user needs not to move the linking parts of the support structure directly with the hand when opening or closing the support structure, preventing loss of supporting function due to friction damage.

7 Claims, 3 Drawing Sheets

AUTO-LOCKING SUPPORT STRUCTURE

BACKGROUND OF THE INVENTION

1. Field of the Invention

The present invention relates to a support structure and, more particularly, to an auto-locking support structure, which is practical for use in a portable computer.

2. Description of Related Art

In order to hold a portable computer in the standing operative position convenient for operation by the user, a support structure may be used. A support structure for this purpose generally comprises a movable supporting member that must be turned between the extended position and the received position by the user. When positioning the portable computer on the support structure, the user must hold the portable computer with one hand and then turn the supporting member to the extended position with the other hand. This operation procedure is complicated and not efficient, resulting in inconvenience of use. Further, frequently turning the supporting member between the extended position and the received position may cause a friction damage, resulting in displacement of the supporting member or loss of the supporting function of the supporting member.

SUMMARY OF THE INVENTION

It is the main object of the present invention to provide an auto-locking support structure, which has an auto-locking design that improves the convenience of use. It is another object of the present invention to provide an auto-locking support structure, which prevents loss of supporting function due to friction damage.

To achieve these and other objects, the auto-locking support structure is constructed in a split base of a portable computer. The split base comprises a pivot joint at a top side thereof, a pivot hole axially disposed in parallel to the pivot joint, sliding track means transversely extended between the pivot joint and the pivot hole, and at least one recessed retaining hole. The auto-locking support structure comprises a cover plate, a pivot shaft, a spiral spring, a link, and a slide. The cover plate has a coupling portion pivoted to the pivot joint, and at least one retaining projection corresponding and adapted to engage with the at least one recessed retaining hole. The pivot shaft has a coupling end formed at one end thereof and pivoted to the pivot hole of the split base, a free end formed at an opposite end thereof, and at least one supporting bar perpendicularly extended from the periphery thereof between the coupling end and the free end. The spiral spring is sleeved onto the coupling end of the pivot shaft. The spiral spring has a first end fixedly connected to the pivot shaft and a second end fixedly connected to the split base. The spiral spring adapted to impart a biasing force to rotate the pivot shaft along the pivot hole and to impart an axial pre-stress to move the pivot shaft axially. The link has a top coupling end pivotally connected to a part of the cover plate beyond the coupling portion of the cover plate, and a bottom coupling end. The slide is pivoted to the bottom coupling end of the link and movable in the sliding track means of the split base, having a beveled portion stopped against the free end of the pivot shaft.

When in use, open the cover plate to lift the link and simultaneously to move the slide backwards. Due to the effect of the contact between the beveled portion of the slide and the free end of the pivot shaft and the biasing force and the pre-stressing force from the spiral spring to the pivot shaft, the pivot shaft is forced to rotate on its own axis and simultaneously to move axially toward the outer side of the pivot hole and to further turn the at least one supporting bar out of the split base for supporting the portable computer. When the portable computer put on the split base and rested on the at least one supporting bar, the pivot shaft is forced by the gravity weight of the portable computer to displace for a small distance and then returned by the spring force of the spiral spring, keeping the portable computer firmly supported on the at least one supporting bar automatically.

When not in use, take the portable computer away from the split base, and then close the cover plate on the split base. When closing the cover plate, the link will be lowered to move the slide forwards, thereby causing the beveled portion of the slide to force the pivot shaft inwards toward the inner side of the pivot hole, and at the same time the at least one supporting bar will be forced and rotated downwards by the cover plate and received in the split base.

DETAILED DESCRIPTION OF THE PREFERRED EMBODIMENT

Figure 1:
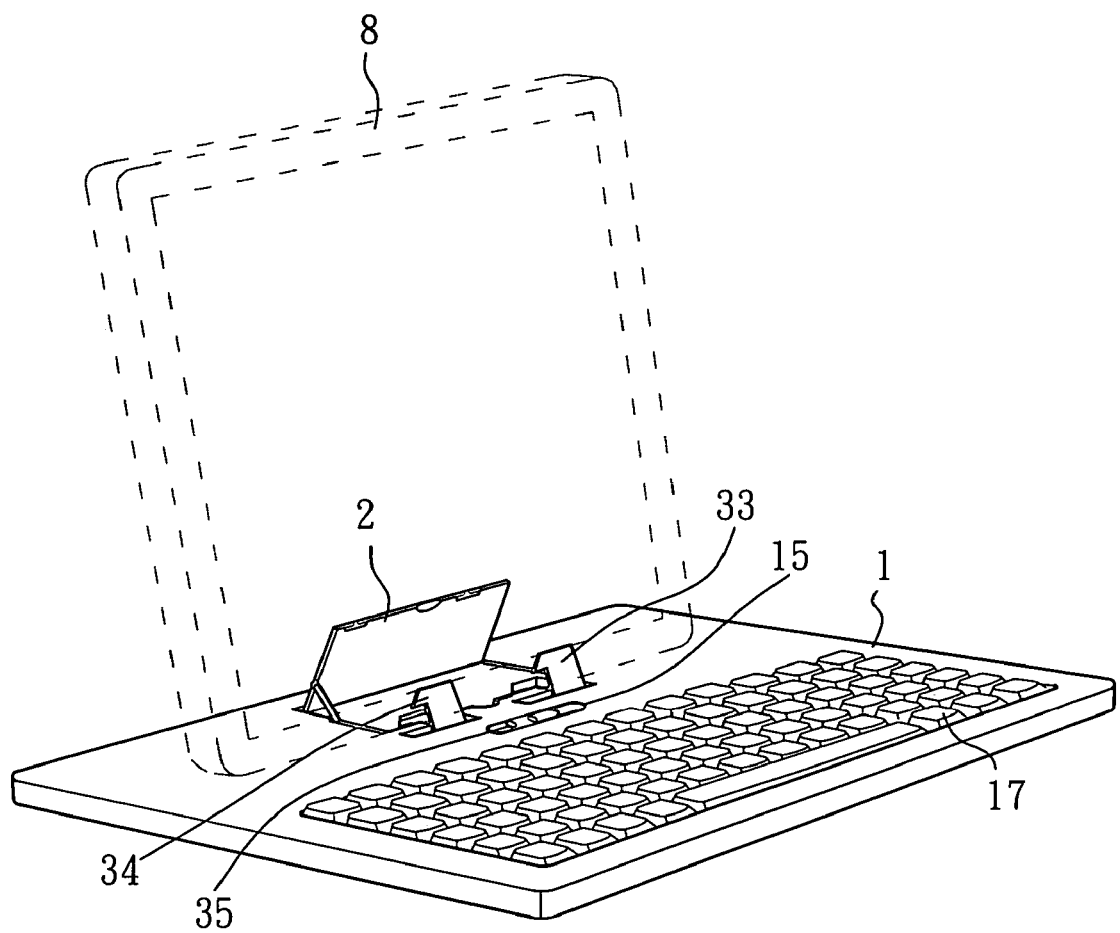
FIG. 1 is a schematic drawing showing an auto-locking support structure installed in the split base of a portable computer according to the present invention.
Figure 2:
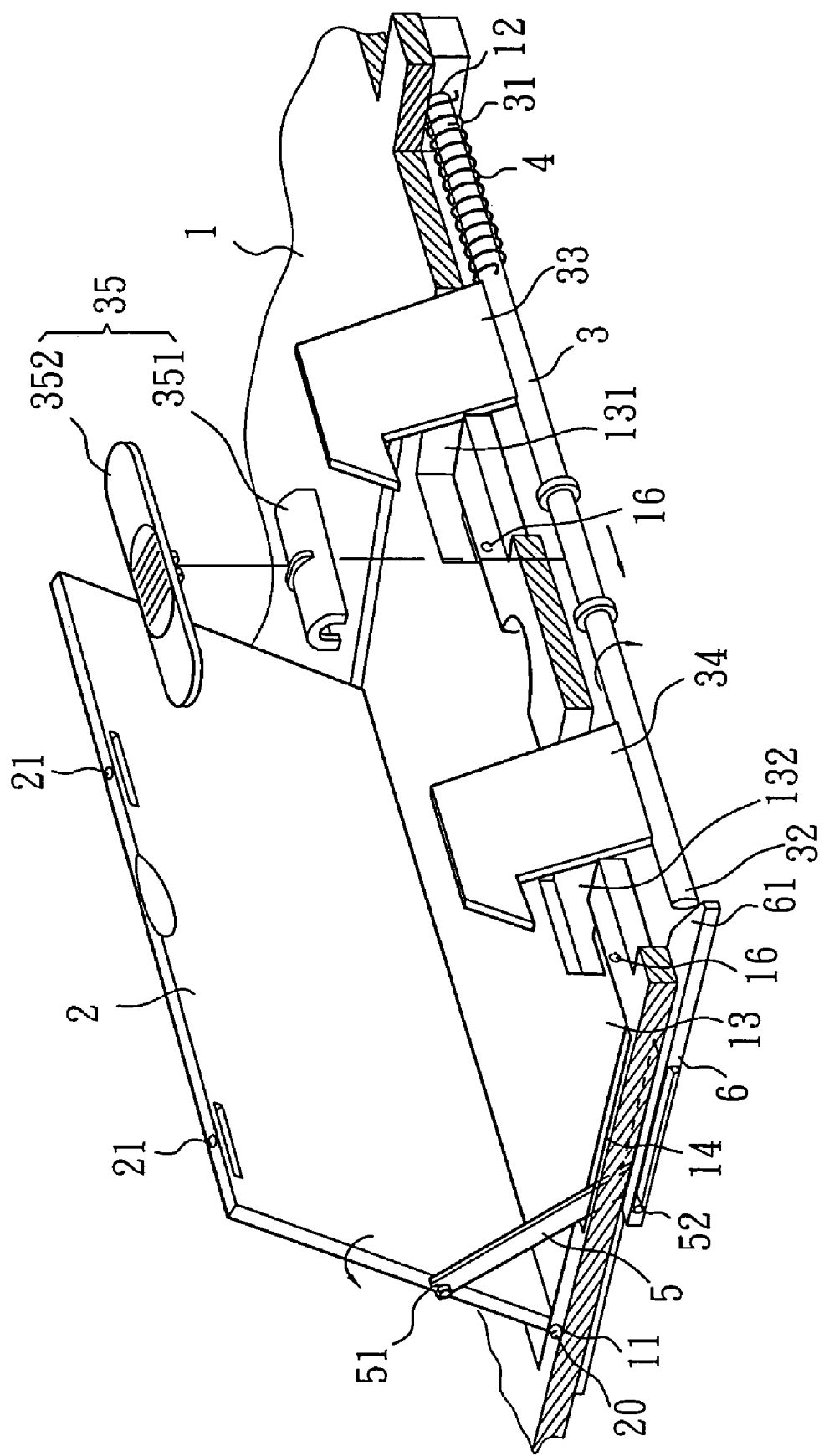
FIG. 2 is an exploded, partially cutaway, of the present invention showing the auto-locking support structure opened.

Referring to FIGS. 1 and 2, an auto-locking support structure is shown constructed in the split base 1 of a portable computer 8. The split base 1 has a pivot joint 11 at the top side thereof, a pivot hole 12 axially disposed in parallel to the pivot joint 11, and sliding track means, for example, a sliding groove 14 transversely extended between the pivot joint 11 and the pivot hole 12.

The split base 1 further comprises on the top side thereof, a keyboard 17, two recessed retaining holes 16, a recess 13, two receiving open chambers 131 and 132 in the recess 13, and an operation hole 15.

The auto-locking support structure comprises a cover plate 2, a pivot shaft 3, a spiral spring 4, a link 5, and a slide 6. The cover plate 2 has a coupling portion 20 pivoted to the pivot joint 11 at the split base 1 for enabling the cover plate 2 to be closed on the recess 13, and two retaining projections 21 corresponding and adapted to engage with the recessed retaining holes 16.

The pivot shaft 3 has one end terminating in a coupling end 31, which is pivoted to the pivot hole 12 of the split base 1, the other end terminating in a free end 32, two supporting bars 33 and 34 perpendicularly extended from the periphery between the coupling end 31 and the free end 32 and receivable in the receiving open chambers 131 and 132 in the recess 13 of the split base 1. Further, an operation device 35 is received in the operation hole 15 of the split base 1, comprising a seat 351 fastened to the pivot shaft 3 and an operation plate 352 mounted on the seat 351.

The spiral spring 4 is sleeved onto the coupling end 31 of the pivot shaft 3, having one end fixedly connected to the pivot shaft 3 and the other end fixedly connected to the split base 1. The spiral spring 4 is adapted to impart a biasing force to rotate the pivot shaft 3 along the pivot hole 12 and to impart an axial pre-stressing to move the pivot shaft 3 axially.

The link 5 has a top coupling end 51 pivotally connected to a part of the cover plate 2 beyond the coupling portion 20, and a bottom coupling end 52 pivotally connected to the slide 6. The slide 6 is movable in the sliding groove 14 at the split base 1, having a beveled portion 61 stopped against the free end 32 of the pivot shaft 3.

Referring to FIGS. 1 and 2 again, when wishing to support the portable computer 8 is the operative position, turn and open the cover plate 2 to lift the link 5 and simultaneously to move the slide 6 backwards along the sliding groove 14. Due to the effect of the contact between the beveled portion 61 of the slide 6 and the free end 32 of the pivot shaft 3 and the biasing force and the pre-stressing force from the spiral spring 4 to the pivot shaft 3, the pivot shaft 3 is forced to rotate on its own axis and simultaneously to move axially toward the outer side of the pivot hole 12 to further turn the supporting bars 33 and 34 out of the receiving open chambers 131 and 132 of the split base 1 for supporting the portable computer 8. When the portable computer 8 put on the split base 1 and rested on the supporting bars 33 and 34, the pivot shaft 3 is forced by the gravity weight of the portable computer 8 to displace for a small distance and then returned by the spring force of the spiral spring 4, keeping the portable computer 8 firmly supported on the supporting bars 33 and 34 automatically.

Figure 3:
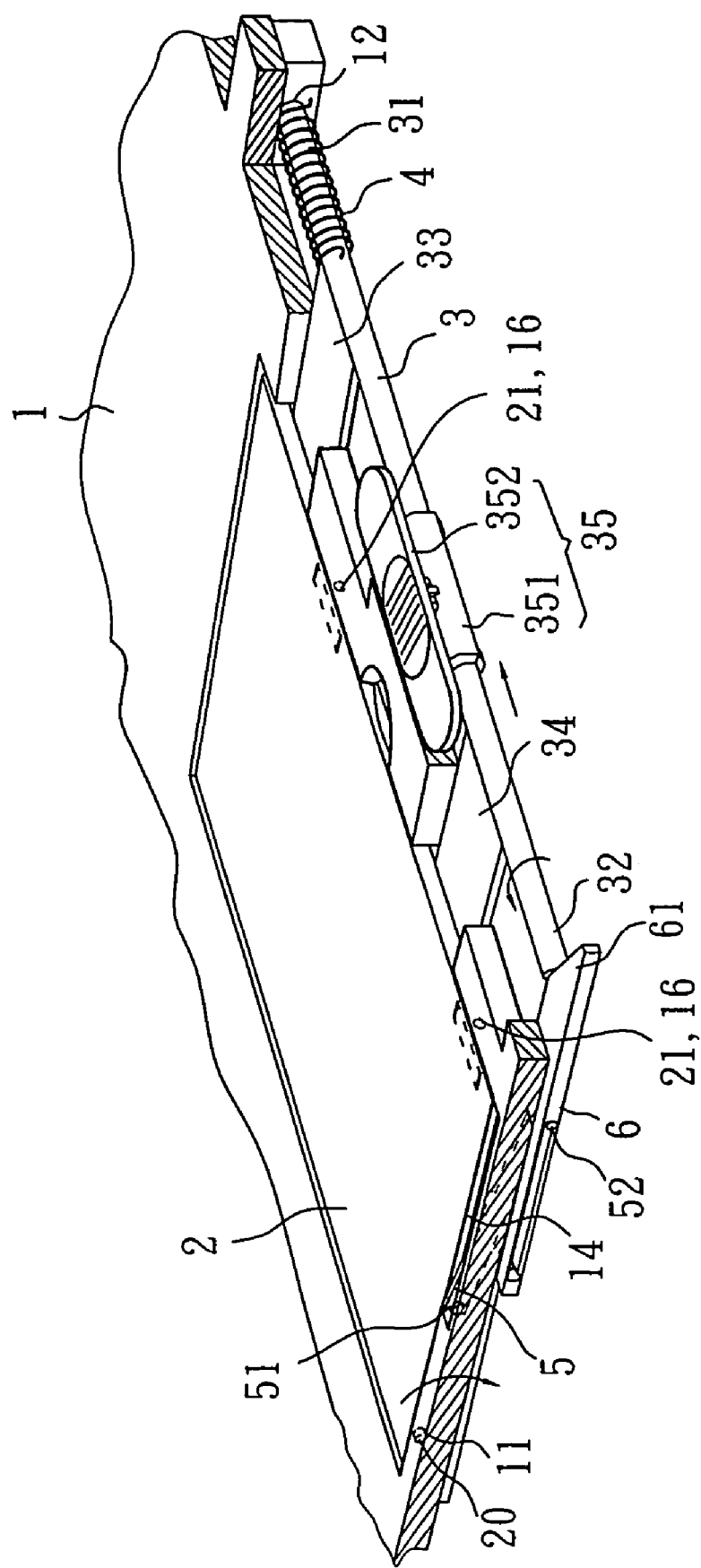
FIG. 3 is a perspective view of the present invention showing the auto-locking support structure closed.

Referring to FIG. 3 and FIG. 1 again, when not in use, take the portable computer 8 away from the split base 1, and then close the cover plate 2 on the split base 1. When turning and closing the cover plate 2, the link 5 will be lowered to move the slide 6 forwards along the sliding groove 14, thereby causing the beveled portion 61 of the slide 6 to force the pivot shaft 3 inwards toward the inner side of the pivot hole 12, and at the same time the supporting bars 33 and 34 will be forced and rotated downwards by the cover plate 2 and received in the receiving open chambers 131 and 132 of the split base 1. After the cover plate 2 has been set into the recess 13 of the split base 1, the projections 21 of the cover plate 2 are respectively engaged into the recessed retaining holes 16 of the split base 1 to hold the cover plate 2 in the closed position.

By means of the aforesaid design, the auto-locking support structure is provided to support the portable computer 8 in the operative position for convenient use. When opening or closing the supporting bars 33 and 34, the arrangement of the pivot shaft 3, cover plate 2 and spiral spring 4 enables the supporting bars 33 and 34 to be automatically ejected out of the split base 1 or received inside the split base 1, preventing friction damage and loss of supporting function due to direct touch of the user's fingers at the other movable parts.

Although the present invention has been explained in relation to its preferred embodiment, it is to be understood that many other possible modifications and variations can be made without departing from the spirit and scope of the invention as hereinafter claimed.

What is claimed is:

1. An auto-locking support structure constructed in a split base of a portable computer, said split base comprising a pivot joint at a top side thereof, a pivot hole axially disposed in parallel to said pivot joint, sliding track means transversely extended between said pivot joint and said pivot hole, and at least one recessed retaining hole, the auto-locking support structure comprising:
    a cover plate, said cover plate having a coupling portion pivoted to said pivot joint, and at least one retaining projection corresponding and adapted to engage with said at least one recessed retaining hole;
    a pivot shaft, said pivot shaft having a coupling end formed at one end thereof and pivoted to said pivot hole of said split base, a free end formed at an opposite end thereof, and at least one supporting bar perpendicularly extended from the periphery thereof between said coupling end and said free end;
    a spiral spring sleeved onto the coupling end of said pivot shaft, said spiral spring having a first end fixedly connected to said pivot shaft and a second end fixedly connected to said split base, said spiral spring adapted to impart a biasing force to rotate said pivot shaft along said pivot hole and to impart an axial pre-stress to move said pivot shaft axially;
    a link, said link having a top coupling end pivotally connected to a part of said cover plate beyond the coupling portion of said cover plate, and a bottom coupling end; and
    a slide pivoted to the bottom coupling end of said link and movable in said sliding track means of said split base, said slide having a beveled portion stopped against the free end of said pivot shaft.

2. The auto-locking support structure as claimed in claim 1, wherein said split base further comprises a top recess on the top side thereof and adapted to accommodate said cover plate when said cover plate is turned and closed on said top recess of said split base.

3. The auto-locking support structure as claimed in claim 2, wherein said split base further comprises at least one receiving open chamber formed in said top recess and adapted to accommodate said at least one supporting bar.

4. The auto-locking support structure as claimed in claim 1, wherein said sliding track means is a sliding groove formed in said split base and transversely extended between said pivot joint and said pivot hole.

5. The auto-locking support structure as claimed in claim 1, wherein said split base further comprises an operation hole at the top side thereof; said pivot shaft further comprises an operation device provided at the periphery thereof and received in said operation hole.

6. The auto-locking support structure as claimed in claim 5, wherein said operation device comprises a seat provided at the periphery of said pivot shaft, and an operation plate mounted on said seat.

7. The auto-locking support structure as claimed in claim 1, wherein said split base further comprises a keyboard at the top side thereof.

* * * * *